(No Model.)
J. A. LOMBAS.
MACHINE FOR FILTERING CANE JUICE.
No. 588,074. Patented Aug. 10, 1897.
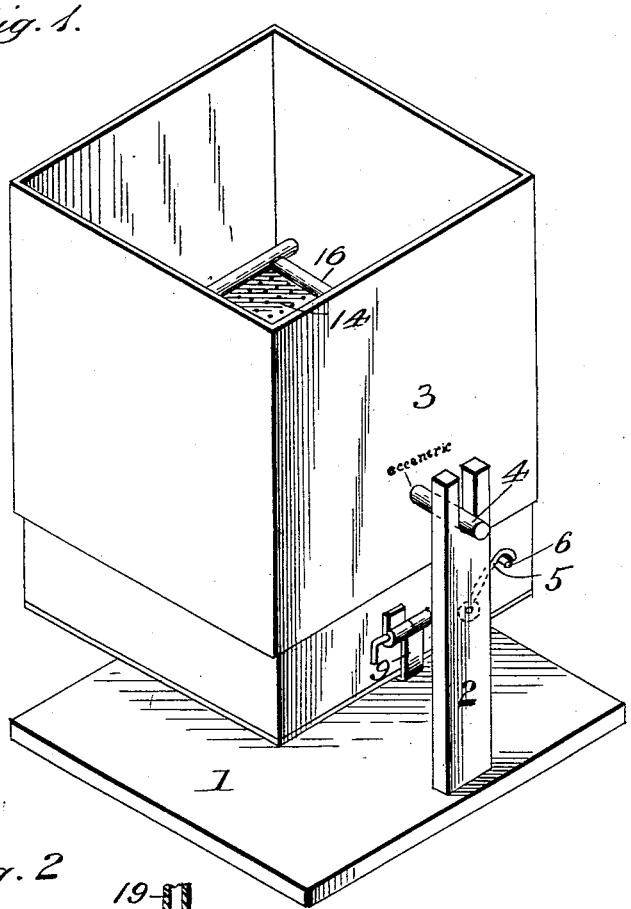
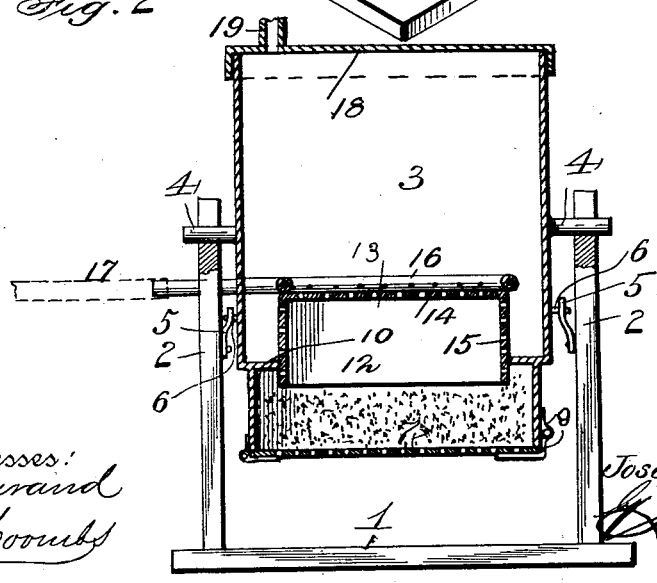
Witnesses:
F. L. Ourand
Jo. L. Coombs
Inventor:
Joseph A. Lombas

United States Patent Office.

JOSEPH A. LOMBAS, OF LOCKPORT, LOUISIANA, ASSIGNOR OF ONE-HALF TO ERNEST AMIDÉE BOUDREAUX, OF CYPRE MORT LANDING, LOUISIANA.

MACHINE FOR FILTERING CANE-JUICE.

SPECIFICATION forming part of Letters Patent No. 588,074, dated August 10, 1897.

Application filed April 12, 1897. Serial No. 631,808. (No model.)

*To all whom it may concern:*

Be it known that I, JOSEPH A. LOMBAS, a citizen of the United States, and a resident of Lockport, in the parish of La Fourche and State of Louisiana, have invented certain new and useful Improvements in Machines for Filtering Cane-Juice; and I do hereby declare that the following is a full, clear, and exact description of the invention, which will enable others skilled in the art to which it appertains to make and use the same, reference being had to the accompanying drawings, which form a part of this specification.

My invention relates to filters more especially designed for filtering cane-juice; and its object is to provide an improved construction of the same which shall possess superior advantages with respect to efficiency in use.

The invention consists in the novel construction and combination of parts hereinafter fully described and claimed.

In the accompanying drawings, Figure 1 is a perspective view of a filter constructed in accordance with my invention. Fig. 2 is a longitudinal sectional view of the same.

In the said drawings the reference-numeral 1 designates a base provided with uprights or standards 2, to which is journaled a receptacle 3 for containing the juice or other liquid to be filtered. The journals 4 of this receptacle are placed at one side of the center thereof, so that the receptacle will turn upside down when hooks secured to the standards are disconnected from the receptacle.

The numeral 5 designates these hooks, which are pivoted to the standards, and when the receptacle is in an upright position they engage with pins 6, whereby it is held in such position.

The numeral 7 designates a bottom of wire-gauze or perforated material, hinged at one end to one of the lower edges of the receptacle and provided at its opposite end with a hook or catch 9, with which engages a laterally-movable pin located in an eye on the said receptacle. By moving this pin in or out it can be engaged with and disengaged from the catch to hold or release the said bottom. Located in said receptacle above said bottom is a false bottom 10, provided with a central opening 12. Surrounding this opening is a filtering-cap 13, consisting of a top 14 and a downwardly-depending rim or sides 15 of perforated metal, the lower edges of which are secured to the false bottom adjacent to said opening. Extending around the top of this filtering-cap is a perforated steam-pipe 16, which extends outside the receptacle and is connected with a hose 17, leading to a steam-generator or other source of steam-supply. (Not shown.)

In the above construction the liquid is filtered by gravity, but it may be filtered under pressure by providing the receptacle 3 with a hermetically-closed cover 18, having a pipe 19, connected with a pump, (not shown,) by which the liquid is forced into the receptacle.

The space between the perforated bottom and the false bottom is packed with sawdust, which I have found to be an excellent filtering material.

The operation is as follows: The liquid-receptacle is filled with liquid or the latter forced thereinto under pressure, as the case may be, and will escape through the perforated cap and percolate or be forced through the sawdust and out through the perforated bottom into a receptacle or pan placed below the latter to receive the filtered or purified juice. While this operation is taking place, steam is forced through the perforated pipe, which will clear the filtering-cap of any impurities which may settle thereon to prevent clogging of the perforations or openings of the latter. When it is desired to clear the receptacle 3 from the sediment, the hooks 5 are disengaged from the pins 6, when the receptacle will tip over and dump the contents of the latter. The sawdust between the perforated and false bottom may be removed when desired by turning the receptacle upside down and opening the perforated bottom.

Having thus fully described my invention, what I claim is—

1. In a machine for filtering cane-juice, the combination with the base and standards and the receptacle eccentrically journaled to said standards, of a hinged perforated bottom, and the false bottom with a space therebetween to receive filtering material, of the perforated cap located above and secured to said false bottom and the perforated steam-pipe at the upper end thereof, extending outside the receptacle, substantially as described.

2. In a machine for filtering cane-juice, the combination with the liquid-receptacle, the hermetically-closed cover provided with a pipe, the perforated hinged bottom and the false bottom with a space therebetween, of the perforated filtering-cap and the perforated steam-pipe at the upper end thereof, extending outside the receptacle, substantially as described.

In testimony that I claim the foregoing as my own I have hereunto affixed my signature in presence of two witnesses.

JOSEPH A. LOMBAS.

Witnesses:
  ERNEST A. BOUDREAUX,
  J. B. VERDER, Jr.